May 14, 1929.                    J. W. GALLAGHER                    1,712,791
                                    RELIEF VALVE
                                  Filed Oct. 6, 1925
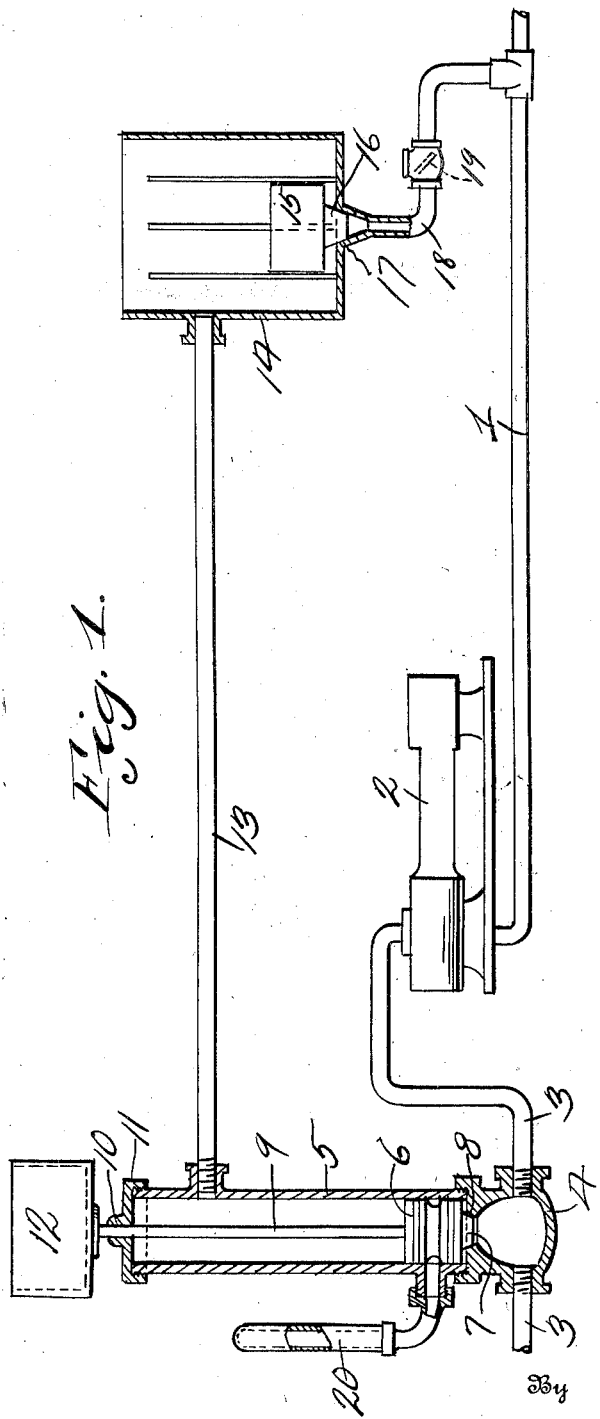
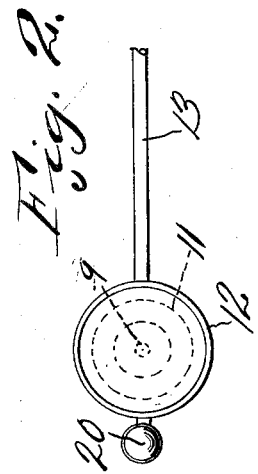
Inventor
J. W. Gallagher
By D. Swift
       Attorney Patented May 14, 1929.

1,712,791

UNITED STATES PATENT OFFICE.

JOHN W. GALLAGHER, OF SENECA FALLS, NEW YORK.

RELIEF VALVE.

Application filed October 6, 1925. Serial No. 60,927.

The invention relates to relief valves, particularly adapted for use in connection with oil pumping lines, and has for its object to provide a vertically disposed valve casing into the lower end of which oil is pumped, and a vertically slidable piston in said valve casing, which is weight controlled, and which piston is raised, when the pressure exceeds a predetermined amount.

A further object is to provide a tank having a pipe connection with the valve casing, and through which pipe and into which tank oil discharged from the valve casing passes. The tank is provided with a float controlled valve which controls the flow of oil back into the pipe line when the pressure in the pipe line falls. Also to provide a check valve in the pipe connecting the tank with the pipe line for preventing suction through the tank under normal conditions, but at the same time allowing the oil from the tank to flow into the pipe line.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a vertical longitudinal sectional view through the relief valve showing the same applied to a conventional form of oil pump line.

Figure 2 is a top plan view of the relief valve.

Referring to the drawing the numeral 1 designates a suction pipe line leading to a pump 2, and 3 a delivery pipe. It has been found that valve casings and pipe line fittings are often broken incident to the high pressure and to obviate this difficulty the present device is primarily designed. Delivery pipe 3 is provided with a valve casing 4, in the upper side of which is threaded a valve casing 5. Slidably mounted in the valve casing 5 is a piston 6, the lower end of which is provided with a valve 7, which cooperates with a valve seat 8 of the casing 4. The valve 7 is normally seated until there is an excess pressure and at which time the piston 6 is forced upwardly. The piston 6 is provided with a vertically disposed rod 9 which is slidably mounted in a bearing 10 of the cap 11 of the valve casing 5, therefore it will be seen that the rod 9 will be accurately guided during its upward and downward movement. Secured to the upper end of the valve rod 9 is a weight receiving receptacle 12, in which weights may be placed for regulating the movement of the valve at a predetermined pressure and by providing the weight receiving receptacle 12, the operation of the device at any predetermined pressure may be regulated.

Connected to the vertically disposed valve casing 5 adjacent its upper end is a discharge pipe 13, which discharge pipe is in turn connected to a tank 14. It will be seen that when the pressure within the pipe lines 1 and 3 rises above a predetermined amount, the piston 6 will be forced upwardly until it is adjacent the upper end of the casing 5, and at which time oil will pass through the pipe 13 and be discharged into the tank 14, and when the pressure again falls the piston 6 will be moved downwardly. The oil discharged into the tank 14 causes the float 15 to rise, thereby moving its valve 16 out of engagement with the valve seat 17 of the pipe 18, and when the pressure falls, the oil which has been discharged into the tank 14 will flow through the pipe 18 by the check valve 19, and into the suction pipe 1, therefore it will be seen that pressure is relieved in the pipe line by allowing discharge of oil therefrom, and oil so discharged is again returned to the pipe line when the pressure is relieved therein. Casing 5 is preferably provided with a compression cylinder 20.

From the above it will be seen that a relief valve is provided for oil pipe lines, which will immediately relieve the pressure on the line when it rises above a predetermined amount, thereby preventing breakage of parts.

The invention having been set forth what is claimed as new and useful is:—

The combination with an oil pipe line, a pump in said line, of a relief valve carried by the delivery end of the pipe, weight means for regulating said relief valve, an oil collecting receptacle, a pipe connection between the oil collecting receptacle and the relief valve whereby oil will be delivered into the receptacle upon the operation of the valve, a float controlled valve within the oil receiving receptacle, a valve seat carried by the receptacle and with which the float controlled valve cooperates, a pipe connection between the oil receptacle and the suction side of the oil pipe and a check valve in the pipe connection.

In testimony whereof I have signed my name to this specification.

JOHN W. GALLAGHER.